United States Patent [19]

Lindbladh et al.

[11] 4,020,528

[45] May 3, 1977

[54] METHOD AND APPARATUS FOR REMOVING SKIN FROM SALTED, SEASONED OR OTHERWISE PRE-TREATED FISH, PREFERABLY HERRING FILETS

[76] Inventors: Stig Lindbladh, Varstavagen 15 C, 140 32 Grodinge; Wallis Stahlberg, Kustvagen 6, 294 04 Horviken, Solvesborg, both of Sweden

[22] Filed: Aug. 15, 1975

[21] Appl. No.: 604,920

[52] U.S. Cl. .................................... 17/50; 17/62; 17/51

[51] Int. Cl.² ........................................ A22C 25/02

[58] Field of Search ............. 17/50, 51, 52, 62, 64, 17/65, 45; 426/643, 480

[56] References Cited

UNITED STATES PATENTS

| | | | |
|---|---|---|---|
| 2,172,471 | 9/1939 | Grow | 17/64 |
| 2,172,472 | 9/1939 | Grow | 17/64 |
| 2,928,118 | 3/1960 | Hairston | 17/64 |
| 2,993,227 | 7/1961 | Couret | 17/64 |
| 3,546,738 | 12/1970 | Heck | 17/62 |
| 3,806,612 | 4/1974 | Satz et al. | 426/643 |
| 3,806,616 | 4/1974 | Mencacci et al. | 17/50 |
| 3,908,230 | 4/1974 | Hartmann | 17/52 |

FOREIGN PATENTS OR APPLICATIONS

| | | | |
|---|---|---|---|
| 1,233,166 | 5/1971 | United Kingdom | 17/65 |

*Primary Examiner*—Louis G. Mancene
*Assistant Examiner*—James D. Hamilton
*Attorney, Agent, or Firm*—John J. Dennemeyer

[57] ABSTRACT

A method and apparatus for removing skin from pre-treated fish, preferably from herring filets, wherein the opened fish is passed skin side up on a conveyor belt through a cutting and cleaning apparatus in which the skin of the fish is contacted with an acid to produce a denaturization of the fish and liquid jets are directed against the skin at a suitable angle to remove the skin which is flushed away together with other parts of the fish severed during the cutting and skin removing operation.

12 Claims, 5 Drawing Figures

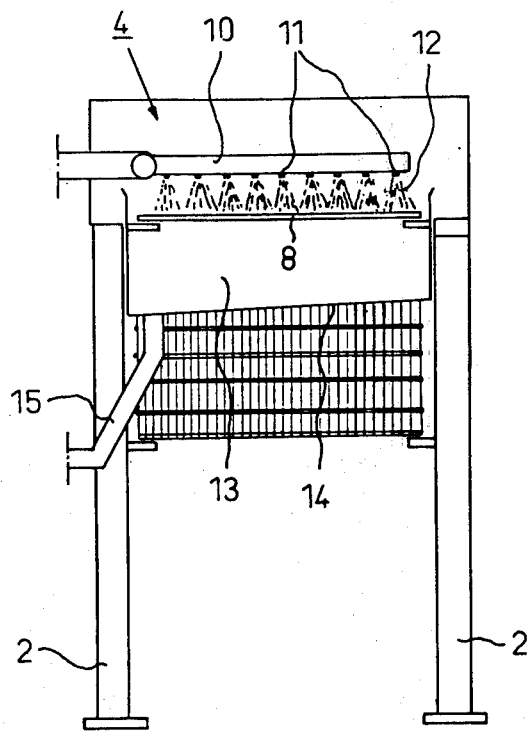

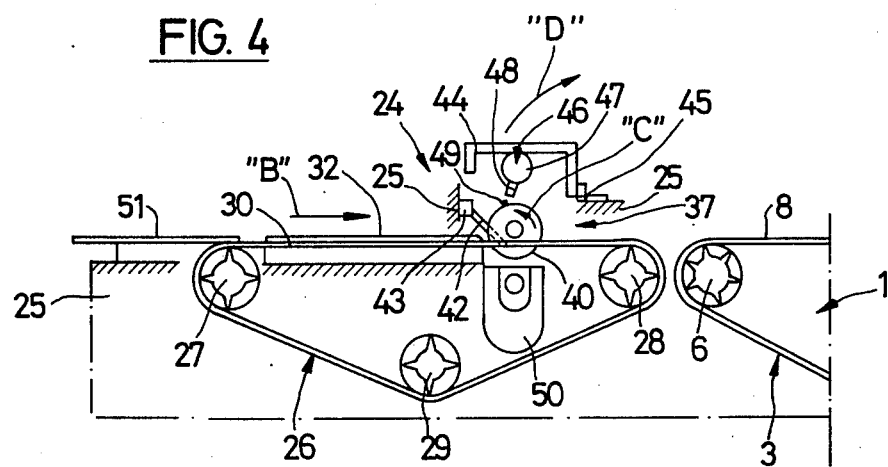
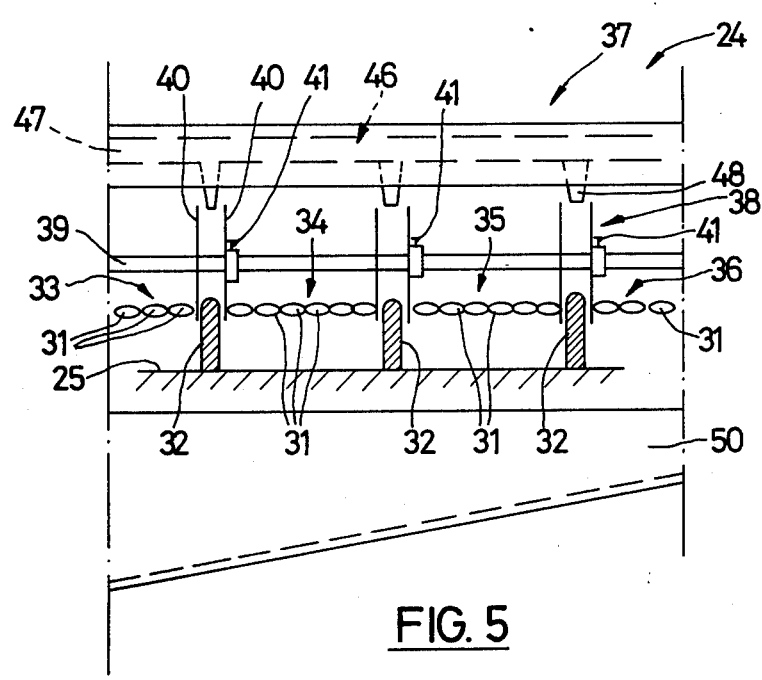

METHOD AND APPARATUS FOR REMOVING SKIN FROM SALTED, SEASONED OR OTHERWISE PRE-TREATED FISH, PREFERABLY HERRING FILETS

The present invention relates to a method of removing skin from salted, seasoned or otherwise pre-treated fish, preferably herring filets. The invention also relates to an apparatus for carrying out said method.

It has been necessary until now, for various reasons, to manually remove skin from salted, seasoned or otherwise pre-treated fish. This method is obviously very time consuming, especially when dealing with small herring filets.

It is therefore an object of the present invention to provide a method enabling skin to be removed mechanically from salted, seasoned or otherwise pre-treated fish without any or with an insignificant loss in fish meat. The method of the invention is defined in and by the appended claims.

An additional object of the present invention resides in the provision of suitable apparatus for carrying out the method in question. This inventive apparatus has the features which are also defined in the appended claims.

The invention will be described in greater detail hereafter with reference to the accompanying drawings, in which:

FIG. 3 illustrates the machine in a front elevational view; and

Figures 1, 2:
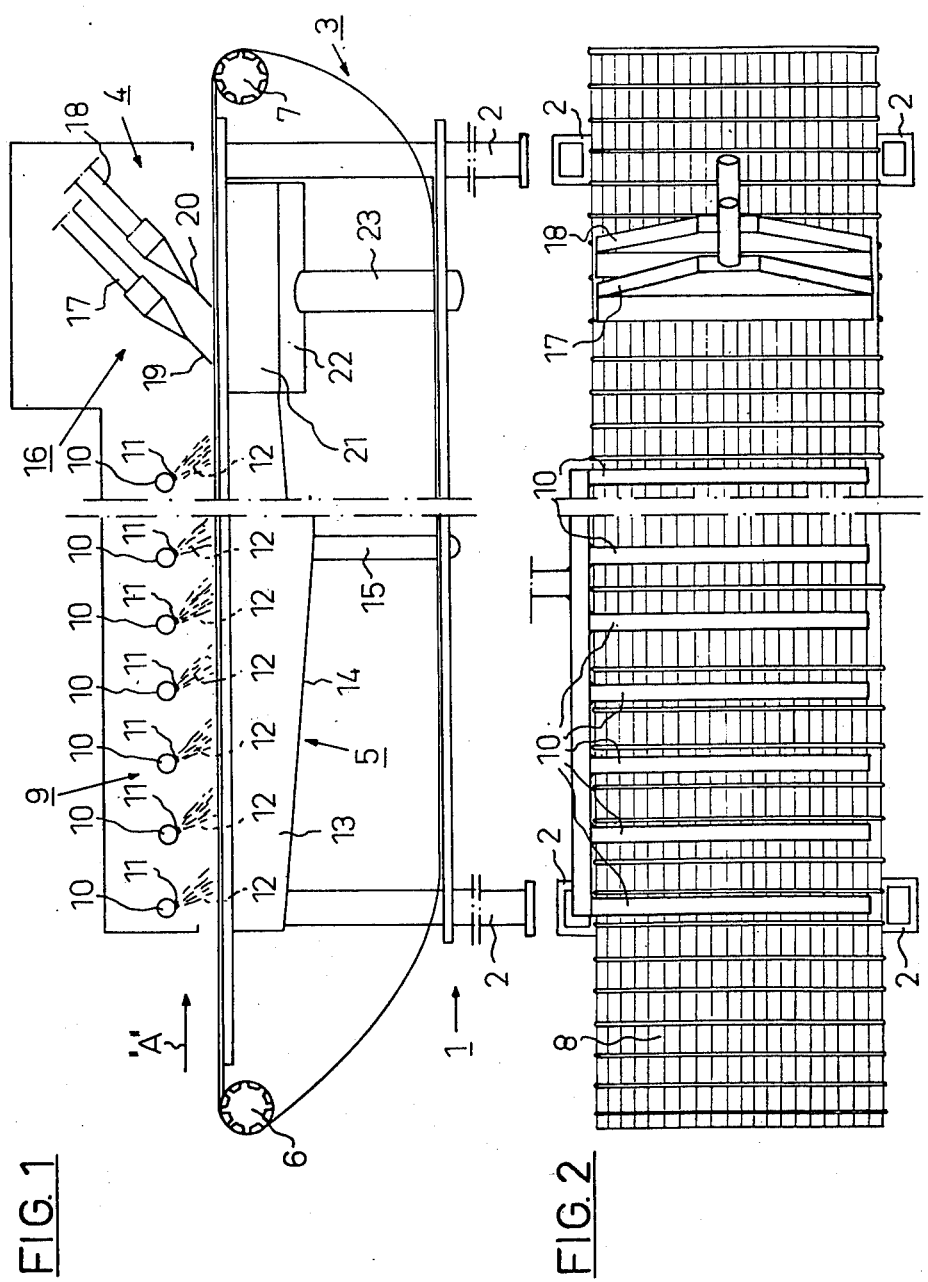
FIG. 1 is a side elevational view diagrammatically illustrating a skinning machine for carrying out the method of the invention.
FIG. 2 illustrates the machine in top plan view.

FIGS. 4 and 5, in side elevation and front elevation, respectively, illustrate a fin cutting device connected to the machine.

Referring to the drawings, the machine illustrated therein comprises a framework 1 having four support legs 2, an endless conveyor belt 3, a liquid supplying unit 4 and a liquid draining unit 5.

The conveyor belt 3 is arranged to travel around two end rollers 6 and 7, at least one of which is operatively connected to a relatively low powered variable speed worm gear motor (not shown). Between said end rollers 6 and 7 the load carrying run 8 of the conveyor belt 3 extends substantially horizontally, and the conveyor belt 3 is driven to cause its load carrying run to move in the sense indicated by an arrow "A" in the drawing.

The load carrying run of conveyor belt 3 — as seen in its direction of advance — will first pass beneath a station 9 forming part of the liquid supplying unit 4 and having for its purpose to supply a treatment liquid. Such treatment liquid is supplied through tubes 10 having spray nozzles 11. The latter are arranged and shaped to project spray jets 12 directed downward towards objects carried by the run 8. The load carrying run 8 advances above a chute or trough 13 forming part of the liquid-draining unit 5 and serving to collect the liquid originating from the spray nozzles 11 in the station 9 situated thereabove. The trough 13 is suitably provided with an inclined bottom wall 14 discharging into a drain pipe 15. Liquid from the spray nozzles 11 thus will collect in the trough 13 and is caused to flow out through the discharge or drain pipe 15. Thereafter the liquid is suitably fed back to the tubes 10 by a pump (not shown) to be discharged through the spray nozzles, i.e. the liquid is recirculated.

The load carrying run 8 of the conveyor belt 3 then will pass beneath a station 16, which also forms part of the liquid supplying unit 4 and is adapted to supply clean flushing liquid. This liquid is supplied to the objects through a number of (preferably two) slot orifice nozzles 17 and 18. Each such slot orifice nozzle 17, 18 is designed and arranged to project a uniform and knife blade shaped flush jet 19, 20 directed at an angle of 30° to 60°, preferably 45°, relative to the load carrying run 8 of the conveyor belt and oriented obliquely against the direction of advance of the run.

The flushing liquid together with the entrails of the fish is collected by a chute or trough 21 forming part of the liquid draining unit 5 and having a bottom wall 22 inclining downward towards a discharge conduit 23. Disposed in the trough 21 or in the conduit 23 is at least one filter or strainer (not shown), whereby the entrails can be filtered off and about 80 % of the liquid can suitably be recirculated to said slot orifice nozzles 17, 18 by a pump (not shown).

The conveyor belt 3 is suitably made of a netting which is relatively coarse meshed in order, together with liquid, to pass therethrough residual skin fragments and any fin remnants.

The machine thus described is fairly well suited for carrying out the method of the present invention. According to this method, salted, seasoned or otherwise pre-treated (for instance vinegar prepared) fish, preferably herring filets, is treated to cause denaturation of the skin of the fish by contacting the skin with an acid, preferably acetic or citric acid, which is capable of separating proteins, i.e. of breaking up peptide bonds. The acid is suitably maintained at a temperature of 14° to 20° C, preferably 15° to 17° C. In addition to acetic or citric acid, any other acid suitable for use in the food production industry and having the properties just described may be used.

To carry out the method of the invention, the fish is placed on the load carrying run 8 of the conveyor belt, and if fish filets, preferably herring filets, are to be treated they are disposed with their skin side up. The conveyor belt 3 is started and the fish is passed through station 9 at which the fish is sprayed with the acid which is supplied under pressure through the spray nozzles 11. The denaturation taking place during the spraying operation is caused by the fact that the distance from the iso-electrical point increases, meaning a pH-displacement towards the acidic region. At the same time sodium chloride will disappear, which involves an increase of the bonding forces between the peptide chains at the acidic side of the iso-electrical point. This is true for sodium concentrations below 5 %. This treatment gives the skin a gelatinous consistency, caused by the drop below the iso-electrical point. The effectiveness of the treatment is adjustable by varying the speed of advance of the conveyor belt 3, i.e. the speed of conveyance of the fish, through station 9, and said effectiveness can also, or alternatively, be adjusted by varying the pressure of the spray jets and/or the spacing of the spray nozzles 11 from the load carrying run 8. It is preferred to project the spray jets or to dispose the fish on the conveyor belt in such a way as to cause the spray jets to hit skin covered portions of the fish only.

Due to the treatment thus described at least the major portion of the skin will have a gelatinous consistency when the fish is leaving the station 9, the treatment liquid used being simultaneously recirculated for reuse, thus permitting a very low acid consumption.

After this treatment of the fish skin (which can now easily be flushed away), the fish is transferred into the clean flushing station 16. The skin and any fin remnants are flushed away by means of the knife-like jets 19, 20 from the nozzles 17, 18. To this end the fishes should be placed in such positions on the load carrying run 8 of the conveyor belt 3 that the jets will not impinge the fish against its meat fibre structure, since otherwise there would be a risk of splitting up the meat. For example, the first jet 19, as seen in the direction of advanve, may be directed to impinge the skin only slightly inclined relative to the direction of advance, while the second jet 20 is caused to impinge the skin from a more inclined direction relative to the direction of advance. It is preferred, however, to direct the jets in relatively parallel directions and so as to form an angle of 30° to 60°, for instance 45°, with the load carrying run 8.

These jets 19, 20 operate to roll the skin, being in a gelatinous condition after said denaturation step, off the fish without causing any damage to the same. The skin is flushed mainly downward through the conveyor belt run 8 and is discharged through the trough 21 and conduit 23. The flushing liquid is supplied at a pressure of, for example, about 2 kp/cm$^2$ and this pressure can be varied according to the fish size and the degree of skin denaturation. The liquid may suitably be water which might be recirculated for reuse, while any skin remnants are filtered off in the course of the recirculation, thus involving a low consumption of fresh water.

Thus, at station 9 a chemical treatment, and at station 16 a mechanical processing of the fish is carried out.

In order to effect a completely automated processing of the fish, the latter, according to a development of the invention, can be processed in a fin cutting device 24. This device comprises a machine frame 25 (indicated diagrammatically only) which is disposed close to, or is rigidly secured to, the machine frame 1. The frame 25 carries a power-driven conveyor belt 26 extending in an endless loop about two end rollers 27, 28 and a guide roller 29. These rollers 27 to 29 are mounted on the machine frame 25, and at least one of them is power driven for driving the conveyor belt to cause its top run to move in the sense indicated by arrow "B" and to form a load carrying run or conveying part 30 which extends from a fish deposition or feed table 51 to the load carrying run 8 of the conveyor belt 3.

The conveyor belt 26 is composed of a plurality of endless conveyor elements 31, for instance flexible plastic tubes, disposed closely side by side, and the belt is divided by stationary frame mounted, elongated guide members 32 into longitudinally extending sections 33, 34, 35, 36, each including a plurality of, for instance four or five, conveyor elements 31.

The guide members 32 preferably project upward to the level of the top surface of the load carrying run (i.e. flush with the conveying path 30 formed by this run) or project slightly above this top surface.

The guide members 32 are directed towards a fin cutting assembly 37 including a plurality of cutting members in the form of knife-edge cutters 38 which are mounted on a stationary frame mounted shaft 39 arranged to be driven by a driving mechanism (not shown). Each cutter 38 comprises two circular knife elements 40 and cooperates with an associated guide member 32 which projects into the space between the two circular knife elements 40. The width of this space is variable at least in that one of the knife elements 40 of each cutter 38 is displaceably mounted on the shaft 39 and adapted to be clamped in place by a clamping screw 41 or the like. Each knife element 40 depends beneath the conveying path 30 and rotates in the sense indicated by arrow "C".

To guide the fins cut away downward, and beside the knife elements, elongated strippers 42 are disposed which, by means of holders 43, are mounted on the machine frame 25 above the conveying path 30. Each stripper extends towards one of the cutters 38 and also downward to terminate between the knife elements 40 thereof at the level of the conveying path 30 or slightly therebelow or thereabove. The holders 43 are preferably so designed as to enable all the strippers 42, or each individual stripper 42, to be adjustable into different angular positions and/or into different height levels relative to the conveying path 30.

The fin cutting assembly 37 further comprises a knife-protection cowling 44 which is movably mounted on the machine frame 25 by hinges 45 or the like. The cowling 44 can be swung upward from a protecting position (arrow "D") for uncovering the cutters 38, so that the latter can easily be cleaned or readjusted when required.

To ensure removal of cut off fins, it may be of advantage to equip the fin cutting assembly 37 with a flushing device 46. The latter preferably comprises a conduit 47 which is fixedly or rotatably mounted on the cowling 44 and extends along the underside of the cowling 44. The conduit 47 is provided with nozzles 48 adapted to project relatively forceful liquid jets 49 from above in an inclined direction inwardly between the knife elements 40 of each cutter 38, so as to cause the jets 49 to pass at the upstream or infeed side of the shaft 39 of the fin-cutting assembly 37.

The jets 49 ejected by the nozzles 48 are effective to press the cut off fins guided downward by the strippers 42 downward into a chute or gutter 50 extending beneath the knives and whose bottom wall is inclined so that the fins can flow over laterally from the machine and can be collected as waste.

For processing the fish filets are placed on the table 27 and are then fed separately or individually onto the conveying path 30 with their skin side up. Each filet, which has normally a longitudinally extending recess beneath its back fin portion, is placed in a manner to cause this recess to be disposed above and to extend along one of the guide members 32. The filet thereby will be disposed quite properly relative to one of the cutters 38. The guide member 32, when the filet is being conveyed in the direction indicated by arrow B towards the fin cutting assembly 37, will guide the filet in such a way towards one of the cutters 38 that the knife element 40 of the actual cutter will cut the filet into three parts, viz. one "central part" containing the back fin of the fish and being discarded as waste, and two "side parts" which are advanced to the conveyor run 8 for denaturation.

The method and apparatus thus described by way of example are intended to elucidate principles of the invention in a non-limiting sense.

What is claimed is:

1. A method for removing skin from salted, seasoned or otherwise pre-treated fish, preferably herring filets, comprising the steps of:

a. preparing the fish by passing the fish filets through cutter means adapted to cut the filets into a central part containing the back fin of the fish, and two side parts, the central part being discarded as waste;

b. placing the side parts of the filets on conveyor means, with the skin uppermost;

c. denaturing the skin on the fish filet side parts by contacting the skin with an acid capable of separating proteins by breaking up peptide bonds, for a time period adequate to turn at least a major portion of the skin to be removed into a gelatinous consistency, said contacting being achieved by moving said fish filet side parts on said conveyor means through a spraying station wherein said skin is sprayed with said acid; and d. removing the denatured, gelatinous skin, by passing the fish filet side parts on said conveyor through a flushing station wherein at least one knife-blade shaped flushing jet of liquid under pressure is directed on the gelatinous skin against the direction of conveyance, said flushing jet being effective to loosen and remove said gelatinous skin from the fish meat.

2. The method of claim 1, wherein the acid used for the denaturation is selected from a group including acetic acid and citric acid, and has a temperature of 14° to 20° C, preferably 15° to 17° C.

3. The method of claim 1 wherein the fish is conveyed through the spraying station so that the spray jets impinge only skin covered portions of the fish, preferably herring filets.

4. The method of claim 1 wherein the denaturation effect at the spraying station is adjusted by selectively varying the conveying speed of the fish, the pressure of the spray jets and the spacing of the spray nozzles from the conveying path.

5. The method of claim 1, wherein the final step of removing the denatured, gelatinous skin includes the sequential steps of: subjecting said fish filet side parts to a first knife-shaped flushing jet of liquid under pressure that effects a primary removal of the gelatinous skin and which is directed against the direction of conveyance, and subsequently subjecting the skin covered parts of the fish to at least one second flushing jet which is spaced from said first knife-shaped flushing jet and is also directed against the direction of conveyance, said second flushing jet also being knife-shaped.

6. The method of claim 5 wherein said first flushing jet is directed slightly against the direction of conveyance and said second flushing jet is directed against the direction of conveyance so as to cause it to form an angle of 30° to 60° C, preferably about 45°, with the path of conveyance.

7. The method of claim 5, wherein said liquid used for flushing off the skin is water.

8. The method of claim 7 wherein the acid used in the denaturation step is recirculated after it has been used to treat the skin.

9. The method of claim 8 wherein at least a major portion of the flushing water, after having flushed off skin, is drained through the conveyance path.

10. Apparatus for use in removing skin from salted, seasoned or otherwise pre-treated fish, preferably herring filets, comprising:

a. a preparation station for readying the fish for further treatment, comprising: conveyor means, including a plurality of spaced sets of longitudinally extending endless conveyor elements, the sets of conveyor elements being separated by stationary guide members; a double-edged rotary cutter positioned over each stationary guide member, whereby a fish placed on said stationary guide member and transported by said longitudinally extending endless conveyor elements on either side thereof will be cut by said rotary cutter into a central part containing the back fin of the fish, and two side parts; and means associated with said rotary cutters and said conveyor elements for removing and discarding said central fish part;

b. a spraying station positioned after said preparation station, and including: conveyor belt means adapted to receive said two side parts of said fish filet and to support them with the skin uppermost; spray nozzle means mounted above said conveyor belt means; and means connected with said spray nozzle means for supplying an acid under pressure thereto to effect denaturing of said fish skin; and c. a skin removing station positioned after said spraying station along said conveyor belt means, and including: at least one flushing jet mounted to extend transversely of said conveyor belt; and means connected with said flushing jet for supplying liquid thereto under pressure, said flushing jet being arranged to produce a knife-blade shaped jet of liquid directed against the direction of conveyance of said side parts of said fish filet and to strike said side parts, said knife-blade shaped jet of liquid being effective to remove denatured, gelatinous skin from said fish side parts.

11. Apparatus as recited in claim 10, wherein said skin removing station includes two spaced, transversely extending flushing jets, each arranged to produce a knife-blade shaped jet of flushing liquid, said jets being arranged at an angle of from 30° to 60° relative to said conveyor belt means.

12. Apparatus as recited in claim 11, including additionally;

a. means associated with said spraying station for capturing excess acid sprayed through said spray nozzle means; and pump and conduit means connected to recycle said captured excess acid through said spray nozzle means; and b. means associated with said skin removing station, arranged and adapted to capture and recycle the flushing liquid.

* * * * *